Sept. 14, 1965  A. B. VANONI  3,205,658
FUEL BURNER WITH FLAME HOLDER
Filed Sept. 16, 1963
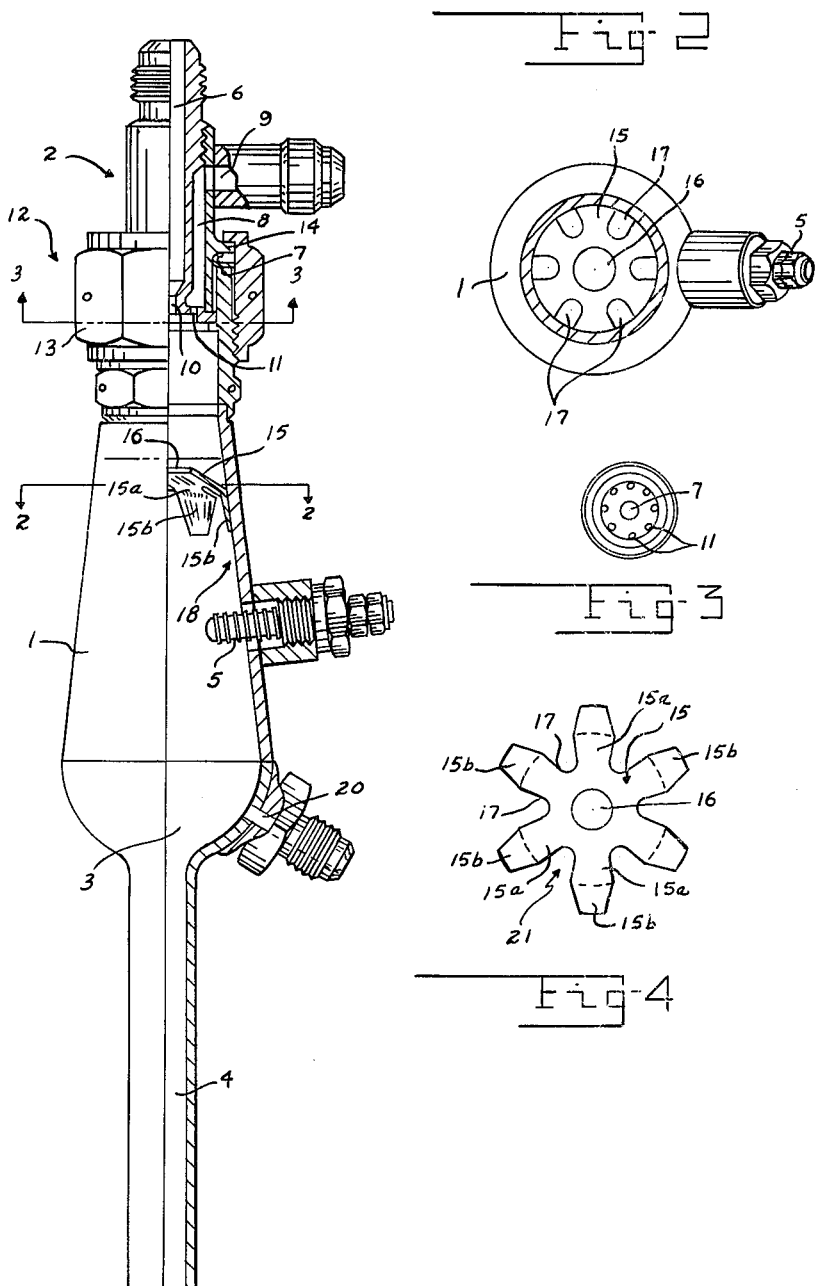
INVENTOR.
ALDO B. VANONI
BY
ATTORNEYS _United States Patent Office_ 3,205,658
Patented Sept. 14, 1965

3,205,658
FUEL BURNER WITH FLAME HOLDER
Aldo B. Vanoni, North Hollywood, Calif., assignor to the United States of America as represented by the Secretary of the Air Force
Filed Sept. 16, 1963, Ser. No. 309,361
5 Claims. (Cl. 60—39.72)

This invention relates to bi-propellant combustion chambers and has for an object the provision of means for keeping the walls of the combustion chamber relatively cool and preventing carbon depositations from building up on the walls of the combustion chamber.

A further object is the provision of a bi-propellant combustion chamber having an improved conical flame holder baffle having means for admitting or passing a fuel and oxidizer concentrically therethrough, and means for directing a portion of the fuel therethrough outwardly toward and along the wall of combustion chamber to provide a fuel and oxidizer pattern in which the oxidizer and a portion of the fuel are directed through the central portion of the flame holder with a portion of the fuel directed outwardly in concentric relation through the rim of the flame holder against the inner surface of the combustion chamber to control the temperature of the inner wall of the combustion chamber.

A further object of the invention is the provision of an elongated outwardly tapered bi-propellant combustion chamber having axially and centrally disposed oxidizer injection means in its small end for admitting an oxidizer axially thereinto, with concentric fuel injection means for injecting a portion of the fuel into the combustion chamber in concentric surrounding relation to the injected oxidizer, including a conical flame holder disk fixed at its periphery to the inner wall of the combustion chamber adjacent to and in front of the fuel and oxidizer injection means in which said flame holder disk inclines toward the oxidizer injection means and is provided with a relatively large central orifice for passing the injected oxidizer and a portion of the injected fuel therethrough and formed with a series of smaller orifices therein in juxtaposed relation to the inner wall of the combustion chamber for directing injected fuel striking said flame holder in an outward downstream direction toward the inner wall of the combustion chamber and through the series of small orifices and along the inner wall in concentric surrounding relation to the injected oxidizer and fuel passing through the relatively large central orifice for controlling the temperature of the wall of the combustion chamber down stream from said injection means.

A further object is the provision of a conical flame holder baffle formed of sheet metal having a central opening with a surrounding conical surface adapted to be fixed in a combustion chamber with the taper thereof inclining inwardly toward the fuel and oxidizer injection means in which said disk is radially slotted inwardly from its periphery in a plurality of circumferentially equally spaced points to provide a series of smaller equally spaced openings around its periphery adapted to provide fuel passsnig passages between the wall of the combustion chamber and the conical surface, for the passage of injected fuel therethrough along the wall of the combustion chamber when said flame holder disk is inserted therein for cooling the inner wall of the combustion chamber.

A further object is the provision of an oxidizer ejection nozzle having a central oxidizer discharge opening for discharging an oxidizer therefrom in an axial direction, a fuel ejection nozzle surrounding said oxidizer injection nozzle having a plurality of fuel ejection apertures disposed in concentric surrounding spaced relation to said oxidizer discharge opening including a combustion chamber concentrically surrounding said fuel ejection apertures in said fuel ejection nozzle, comprising a substantially conical body increasing in diameter in a direction away from said injector nozzle and a conical flame deflector baffle fixed in said conical body adjacent the central oxidizer discharge opening having a central orifice in axial alignment with said oxidizer discharge opening and a plurality of smaller fuel passing openings in the periphery thereof in juxtaposed relation to the inner wall of the combustion chamber for passing fuel from said fuel injection apertures along the inner wall of the combustion chamber, said conical flame deflector having an annular conical surface inclining outwardly in a downstream direction from said oxidizer and fuel injection aperture for directing fuel or oxidizer from said aperture impinging said conical surface outwardly toward the inner wall of the combustion chamber and toward the smaller fuel passing openings in the periphery of the conical flame holder, including means in said combustion chamber downstream from said flame holder for igniting the fuel and oxidizer introduced into the combustion chamber.

A further object is the provision of a combustion chamber which is cone-shaped having central oxidizer and surrounding fuel injection means in its small end and a combustion discharge tube in its larger end, and including a conical flame holder baffle in the smaller end for maintaining the flame in the combustion chamber downstream therefrom in the center of the combustion chamber surrounded by fuel in contact with the inner wall of the combustion chamber for controlling the rise in the temperature of the wall of the combustion chamber during the operation thereof.

Other objects and advantages of the invention will become apparent from the following description and accompanying drawings in which like reference characters refer to like parts in the several figures.

FIG. 1 is a side elevation of a combustion chamber device incorporating the invention, the right half portion being broken away and shown in section to disclose the interior thereof.

FIG. 2 is a transverse sectional view taken about on the plane indicated by line 2—2 in FIG. 13 looking in the direction of the arrows.

FIG. 3 is an end view of the oxidizer and fuel injection nozzles alone, taken about on line 3—3 of FIG. 1.

FIG. 4 is a plan view of the blank before being shaped or pressed into the flame holder baffle.

In the drawing the reference numeral 1 denotes a combustion chamber of tapered or conical shape having fuel and oxidizer injection means at its small end indicated generally at 2, the opposite or larger end being hemispherical at 3, a combustion discharge passage or tube leading from the down stream end of the combustion chamber being indicated at 4.

Located in the wall of the combustion chamber 1 intermediate its opposite ends is an ignition device 5 in the form of a "glow plug" which can be heated electrically from any suitable source, not shown, which when switched on provides an initial ignition temperature for igniting a fuel and oxidizer combustion mixture introduced into the combustion chamber 1 and thus start the combustion, after which the glow plug can be extinguished and the combustion will continue so long as the proper mixture of fuel and oxidizer is injected into the combustion chamber through the fuel and oxidizer injection means or nozzle 2.

The fuel and oxidizer injection means 2 comprises a central oxidizer supply tube or passage 6 having a smaller or restricted oxidizer discharge orifice 7 for injecting the oxidizer centrally into the smaller upstream end of the combustion chamber 1 toward the hemispherical inner wall of the downstream end 3.

The oxidizer supply tube or passage 6 is surrounded by a concentric tubular fuel supply tube or passage 8, liquid or gaseous fuel being supplied into the passage through a lateral passage 9.

The end of the passage 8 is closed by a wall or flange 10 having a ring of uniformly spaced fuel injection apertures 11 for injecting the fuel into the small end of the combustion chamber 1 in concentric surrounding relation to the injected oxidizer.

As seen in the drawings the fuel and oxidizer unit may be made removable by the threaded union 12. Unscrewing the flanged nut 13 releases the annular flange 14 and the seal 15, thus permitting the fuel and oxidizer injection nozzle 2 to be withdrawn.

The fuel and oxidizer mixing is accomplished by the flow pattern of the propellants in the combusion chamber together with the design and location of an conical flame holder baffle 15 incorporating the subject matter of the invention.

The flame holder baffle 15 is cone-shaped with a large central hole 16 and six, or more, small openings 17 at its periphery or juncture with the conical interior side wall 18 of the combustion chamber. The flame holder baffle 15 tapes outwardly downstream from the central hole 16 to the inner surface 18 of the combustion chamber and has bent extensions 19 between the openings 17 which are welded or otherwise firmly seruced to the conical side wall 18.

The baffle 15 is located across the combustion chamber adjacent upstream end thereof and therefore in the path of the fuel and oxidizer injected downstream from the apertures 11 and 7 of the injection nozzle 2.

Fuel and oxidizer injected from the injector nozzle 2 allows the fuel, or least a portion of the fuel, to strike the conical body portion of the flame holder baffle 15 in a way that a portion of the fuel is deflected against the inner wall above the baffle and a small amount of the fuel is caused or directed through the surrounding openings 17 along the combustion chamber wall 18, thereby keeping the wall relatively cool and keeping carbon depositations from building up. The injector nozzle 2 and the flame holder baffle 15, in addition to deflecting the fuel, and any oxidizer striking it, outwardly toward and along the wall 18, is designed to mix the propellants and hold the flame in the combustion chamber even when operating at high exhaust gas velocities, the design thus permitting the hot flame to burn in the central portion of the combustion chamber while surrounded by the fuel cooled chamber walls.

An exhaust nozzle (not shown) may be placed in the exhaust tube 4 downstream of the combustion chamber. The combustion chamber wall in the hemispherical portion 13 thereof may be formed with a small outlet passage 20 to which a suitable pressure supply conduit (not shown) is connected.

The conical flame holder baffle 15 may be formed by a stamping or sheet metal blank 21 as seen in FIG. 4 with the central orifice 16 formed therein and the radial arms 15a, each arm 15a having a tab extremity 15b which forms one of the bent extensions 19 when the blank is stamped into its conical shape as seen in FIG. 1 the tabs or extensions 15a (19) lying in contact with the inner conical wall of the smaller end of the combustion chamber where they can be welded (or spot welded) to the inner wall 18. In initiating the operation of the device the glow plug circuit is closed to heat the plug 5 to the combustion mixture ignition temperature. When fuel and oxidizer are admitted past the baffle 15 through the opening 16 and surrounding openings 17 the combustible mixture will be ignited by the glow plug initiating the operation, after which the combustion will continue below the baffle and the glow plug can be turned off.

Fuel strikes the inclined surface of the baffle along with any of the oxidizer striking it will be deflected outwardly toward the wall 18 with a portion of the fuel passing along the wall through the small openings 17 in contact with the wall will continue down along the inner wall with the hotter burning mixture passing through the central portion of the combustion chamber toward and out through the exhaust or discharge tube 4, the cooler surrounding mixture in contact with the wall maintaining the temperature therof lower than the central combustion temperature, the flame holder baffle thus preventing the flame from passing through and above the baffle during the operation of the device.

The combustion chamber, as shown, is designed to operate at an exhaust gas temperature up to 1100° F. without retaining any harmful carbon build-up on any parts of the combustion chamber, this being accomplished by the somewhat "pear shape" of the body design, location and shape of the flame holder together with the design of the injector nozzles allowing the fuel to strike the flame holder baffle in a way to force a small amount of fuel along the chamber body walls, thereby keeping the walls cool and keeping the carbon depositations from building up, the injector nozzle and flame holder mixing the propellants while holding the hotter flame burning in the central portion even when operating at high exhaust velocities, while surrounded by the fuel cooled chamber walls.

For the purpose of exemplification a particular embdiment of the invention has been shown and described to the best understanding thereof. However, it will be apparent that slight changes and modifications in the arrangement and construction of the parts thereof may be resorted to without departing from the true spirit and scope of the invention as defined in the accompanying claims.

I claim:

1. In a bi-propellant combustion device, an elongated combustion chamber, fuel and oxidizer injection means in one of said chamber having central oxidizer injection means and surrounding fuel injection means for injecting oxidizer axially into said combustion chamber toward its opposite end surrounded by fuel for mixing and combustion, a combustion discharge tube in said opposite end of said combustion chamber for discharging the products of combustion in said combustion chamber therethrough, a conical flame holder baffle having an annular upstream inwardly inclined deflecting surface inclining from the inner wall of said combustion chamber toward said central oxidizer injection means in the path of discharge from said fuel injection means, said upstream inclined conical flame holder baffle having a central orifice therethrough for passing a major portion of said oxidizer therethrough and a plurality of smaller openings spaced around the periphery thereof for passing fuel deflected outwardly by said inclined surface through said openings in contact with the inner wall of said combustion chamber, and means in said combustion chamber for initiating combustion of said injected oxidizer and fuel downstream from said flame holder baffle.

2. In a bi-propellant combustion device, an elongated tapered combustion chamber having a small end and an opposite larger hemispherical end, oxidizer and fuel injection means in said small end having a central oxidizer injection means for injecting oxidizer axially in said combustion chamber toward said hemispherical end and surrounding fuel injection means for injecting fuel into said combustion chamber toward said hemispherical end in surrounding relation to the injected oxidizer for mixing in said combustion chamber, a combustion discharge tube extending axially outward from said hemispherical end, a conical flame holder baffle fixed in the small end of said combustion chamber adjacent to said fuel and oxidizer injection means in the path of fuel and oxidizer from said injection means, said flame holder baffle having an annular downstream outwardly inclined deflecting surface for deflecting fuel and oxidizer outwardly toward the periphery of said baffle, said baffle having a central orifice for passing a major portion of the injected oxidizer centrally therethrough and an annular outer portion spaced from the inner wall of the combustion chamber for passing fuel deflected outwardly by said deflecting surface into said combustion chamber in contact with the inner wall of the combustion chamber for controlling the temperature of the combustion chamber wall.

3. A bi-propellant combustion device, comprising a tapered annular combustion chamber, concentric fuel and oxidizer injection means fixed in the smaller end of said combustion chamber having a central oxidizer injection means and a surrounding fuel injection means for injecting oxidizer axially into said combustion chamber surrounded by fuel injected by said fuel injection means, a combustion discharge passage leading from the larger end of said annular tapered combustion chamber, a conical flame deflector baffle fixed to the inner wall of said combustion chamber adjacent the small end thereof, inclining upstream from said inner wall toward said oxidizer injection means, said upstream inclined flame deflector baffle having a plurality of annular spaced openings in its periphery for passing fuel from said fuel injection means therethrough toward said larger end of said tapered combustion chamber in contact with said combustion chamber inner end wall and having a larger central orifice therein in the path of oxidizer from said oxidizer injection means for passing a major portion of the oxidizer centrally therethrough into the central portion of the combustion chamber, and means in said combustion chamber for initiating combustion of said fuel and oxidizer therein downstream from said flame deflector baffle.

4. In a combustion device a tapered combustion chamber, concentric oxidizer and fuel injection means in the smaller end thereof for injecting fuel and oxidizer propellant concentrically into said combustion chamber toward the larger end thereof, a combustion discharge passage leading outwardly from said larger end, a conical flame holder baffle having a peripheral portion fixed to the inner wall of said combustion chamber with its conical surface extending upstream and inwardly in the path of said fuel and oxidizer propellants ejected by said injection means, said conical flame deflector baffle having its periphery circumferentially notched to form a plurality of circumferentially spaced openings for passing one of said fuel and oxidizer propellants past said baffle in contact with the inner wall of the combustion chamber, and formed with a central orifice for passing at least a portion of the other of said propellants centrally through the baffle into the combustion chamber, and means in said combustion chamber downstream from said baffle for igniting the propellants in the combustion chamber downstream from said baffle.

5. In a bi-propellant combustion chamber having a conically tapered inner wall concentric fuel and oxidizer injection means fixed in the smaller end of said chamber for injecting fuel into said combustion chamber in surrounding relation to said oxidizer, a conical flame holder disk having a periphery in annular contact with the inner wall of the combustion chamber adjacent said fuel and oxidizer injection means havings its conical portion inclining upstream inwardly toward said oxidizer injection means for deflecting fuel and oxidizer from said injection means outwardly into contact with said inner wall at the said periphery, said conical disk having a large central orifice therethrough in alignment with said oxidizer injection means for passing a major portion of said injected oxidizer therethrough and formed with a notched periphery forming with circumferentially spaced apertures next to the said wall for passing fuel from said fuel injection means deflected by said conical surface, past said disk in surface contact with the inner wall of said combustion chamber.

References Cited by the Examiner

UNITED STATES PATENTS

| 2,103,958 | 12/37 | Stillman. | |
| 2,529,506 | 11/50 | Lloyd et al. | 60—39.74 X |
| 2,543,762 | 3/51 | Christensen | 60—39.74 |
| 2,896,914 | 7/59 | Ryan | 60—35.6 X |
| 2,925,716 | 2/60 | Regan et al. | 60—39.72 |
| 2,995,896 | 8/61 | King et al. | 60—39.72 |

FOREIGN PATENTS 1,130,578  10/56  France.

SAMUEL LEVINE, *Primary Examiner.*

CARLTON R. CROYLE, *Examiner.*